US005242994A

United States Patent [19]
Nield et al.

[11] Patent Number: 5,242,994
[45] Date of Patent: Sep. 7, 1993

[54] CURABLE COMPOSITION COMPRISING A CRYSTALLISABLE POLYMER

[75] Inventors: Eric Nield, Beaconsfield; Riaz Ahmed, Bucks; Riaz Choudhery, Slough, all of England

[73] Assignee: Imperial Chemical Industries PLC, London, England

[21] Appl. No.: 709,575

[22] Filed: Jun. 5, 1991

[30] Foreign Application Priority Data

Jun. 19, 1990 [GB] United Kingdom ............... 9013679

[51] Int. Cl.$^5$ .......................................... C08F 20/00
[52] U.S. Cl. .................................. 525/438; 525/445; 525/463; 525/465
[58] Field of Search ............... 525/438, 445, 463, 465

[56] References Cited

U.S. PATENT DOCUMENTS

| | | | |
|---|---|---|---|
| 3,607,375 | 9/1971 | Wlejak | 117/138.8 UA |
| 3,766,109 | 10/1973 | Pratt et al. | 260/23 |
| 4,059,557 | 11/1977 | Bentley et al. | 523/522 |
| 4,419,465 | 12/1983 | Backhouse et al. | 523/201 |
| 4,427,820 | 1/1984 | Backhouse et al. | 525/63 |
| 4,525,499 | 6/1985 | Hayashi et al. | 525/7 |
| 4,739,019 | 4/1988 | Schappert et al. | 525/438 |
| 4,952,456 | 8/1990 | Metcalfe et al. | 525/122 |
| 4,997,864 | 3/1991 | Waters | 523/319 |
| 5,084,525 | 1/1992 | Akutagawa et al. | 525/423 |

FOREIGN PATENT DOCUMENTS 1461858 12/1966 France.

OTHER PUBLICATIONS

Chemical Abstracts, vol. 112, No. 14, Apr. 2, 1990, p. 95, abstract No. 120678e, Columbus, Ohio, US; Y. A. Shangin: "Preparation of dispersion coatings by crystallization from solutions".
WPIL, File Supplier, accession No. 82-80909E, Derwent Publications Ltd, London, GB.

*Primary Examiner*—John C. Bleutge
*Assistant Examiner*—Randy Gulakowski
*Attorney, Agent, or Firm*—Cushman, Darby & Cushman

[57] ABSTRACT a composition comprising a polymer phase in dispersion in a non-aqueous continuous diluent in which the polymer phase comprises a crystallizable polymer, selected from polyesters, polyamides and polycarbonates, in intimate admixture with a curable solvent for the crystallizable polymer, a stabilizer and, optionally, an auxiliary solvent.

11 Claims, No Drawings

CURABLE COMPOSITION COMPRISING A CRYSTALLISABLE POLYMER

This invention relates to a curable composition which comprises a crystallisable polymer in intimate admixture with a curable material in dispersion in an inert liquid. It also relates to a process for making the composition and to a modification of the process so as to obtain free flowing powders of polymer particles which comprise a crystallisable polymer in intimate admixture with a curable material. The invention also relates to a process for forming a cured coating which contains a crystallisable polymer using the composition or the powder and to a substrate when coated by the process.

Crystallisable polymers are well known. They include polyesters such as polyethylene terephthalate (PET) polybutylene terephthalate (PBT) (these usually have a density of about 1.4 and 1.3 g/cm$^3$ respectively), or copolymers of ethylene glycol and a mixture of terephthalic and isophthalic acids (PET/I), polycarbonates, and polyamides (often called nylons).

A fuller description of the various types of polyester, polycarbonate or nylon is given in the third edition of Kirk-Othmer's "Encyclopaedia of Chemical Technology" published by John Wiley & Sons of New York in 1982, see Volume 18 pages 549 to 574 pages 479 to 494 or pages 406 to 425 for polyesters, polycarbonates and nylons respectively. The pages are herein incorporated by reference.

Examples of useful polyester copolymers include polyethylene terephthalate, copolymers comprising both terephthalic and isophthalic acid and elastomeric polyesters having segments of a low glass transition temperature, such as polyester-polyether block copolymers some of which are commercially available from E I DuPont de Nemours under the Trade Mark Hytrel.

Examples of useful polyamides are nylon 6,6, nylon 6 and copolymers of these.

Polyamides also include recently available nylon 4,6 and so called partially crystalline aromatic nylons. Aromatic nylons are polyamides comprising condensates of aromatic diamines such as 1,3-di(aminomethyl) benzene. Examples of useful polycarbonates are 2,2-bis (4 hydroxyphenol) propane (Bisphenol A) polycarbonate commercially available from Anic Spa of Italy under the Trade Mark Sinvet.

Some of the above crystallisable polymers can acquire a partially crystalline form merely by cooling from the molten state whilst some (notably the polycarbonates and some polyesters) are amorphous as supplied but may be easily converted to partially crystalline form by exposure to solvents. It is for this reason that the polymers are herein described generically as "crystallisable" rather than "crystalline".

In general, crystallisable thermoplastic polymers have many properties such as toughness, hardness, abrasion resistance and flexibility which make them potentially useful as coating materials.

However, most attempts to incorporate crystallisable thermoplastic polymers into coatings have involved physically grinding the polymer so as to form a polymer powder which is then mixed into a liquid coating composition. These attempts have led to highly inhomogenous structures which because of their inhomogeneity have shown only relatively poor properties in the cured coating.

U.S. Pat. No. 3,766,109 discloses a method of producing powders by grinding a mixture of acrylic polymer, epoxy resin and anhydride, by means of a ball mill.

One composition which comprises a crystalline polyester mixed with a non-crystalline polyester, and a water soluble organic compound in dispersion in water is described in U.S. Pat. No. 4340519. However, this composition suffers from the disadvantage that the aqueous continuous phase can cause hydrolysis and hence degradation of the dispersed polyester resin.

Additionally, these aqueous compositions are made by an emulsion process and therefore are limited to those polymer mixtures which will form liquid solutions at temperatures below 100° C. if the mixture is to be emulsified at standard pressure.

Chemical abstracts, reference 112: 120678e, discloses the recrystallisation of polymers from solutions so as to form polymer particles.

A coating composition comprising a crystallisable polymer having improved homogeneity is described in unpublished copending European Patent Application number 89313522.8. This Application describes a non-attritive process for producing particles of a crystallisable polymer which contain an entrapped crosslinkable solvent for the polymer. One process which is described therein comprises dissolving the crystallisable polymer is a moderate solvent at a temperature above the crystalline melt temperature of the polymer when in the solvent and then allowing the solution to cool so as to cause solid/liquid phase separation of solid polymer.

The result of this process is a dispersion in the solvent of particles of crystallisable polymer which contain imbibed solvent. The process may be carried out using a crosslinkable solvent. Alternatively, a non-crosslinkable solvent may be used which is afterwards exchanged for a crosslinkable solvent. In either case, the end result is particles of crystallisable polymer which contain an entrapped crosslinkable solvent. These particles allow the subsequent production of cured coatings containing a more uniform distribution of crystallisable polymer with consequent improvement in properties.

It is an object of the present invention to provide an alternative composition which comprises a crystallisable polymer intimately admixed with a curable material.

According to the present invention there is provided a composition comprising a polymer phase in dispersion in a non-aqueous continuous diluent, in which the polymer phase comprises a crystallisable polymer, selected from polyesters, polyamides and polycarbonates, in intimate admixture with a curable solvent for the crystallisable polymer, a stabiliser and, optionally, an auxilliary solvent.

The composition can comprise liquid droplets or solid particles of the polymer phase dispersed in the diluent. Preferably the composition comprises solid particles of the polymer phase dispersed in the diluent.

Solid means having a tack temperature of greater than 60° C. Tack temperature is measured by isolating some of the polymer phase, for example by evaporating off the continuous diluent, and applying a dry sample of this onto a surface having a known graduated temperature such as a Kohfler bar. After 1 min., an attempt is then made to brush off the residue using a small soft paint-brush. The temperature above which the residue is not removable in this way is called the Tack Temperature. Preferably the Tack Temperature of the polymer phase is greater than 80° C.

The size of the droplets or particles of the polymer phase is generally between 0.1μ and 500μ, preferably between 0.5μ and 50μ more preferably between 1μ and 50μ and most preferably between 1μ and 10μ.

Preferably, the weight ratio of the curable solvent to the crystallisable polymer in the polymer phase is from 5:85 to 85:15, more preferably 20:80 to 80:20, and most preferably 40:60 to 60:40.

Preferably, the polymer phase comprises at least 5% by weight of the composition, more preferably from 20 to 80% by weight of the composition and most preferably from 40 to 70% by weight of the composition.

The crystallisable polymer can comprise a single crystallisable polymer or a blend of two or more crystallisable polymers.

Preferably the crystallisable polymer is a polyester.

The curable solvent is a material which is capable of undergoing curing, and which in its uncured state can form a homogeneous solution together with the crystallisable polymer and any auxiliary solvent present.

Preferably the curable solvent is chosen such that phase separation of crystallisable polymer from the polymer phase can occur on curing the solvent. This has the advantage that a crosslinked coating formed from the composition can comprise a continuous cured material derived from the curable solvent, in which are distributed discrete zones preferably continuous zones, of crystallisable polymer.

The phase separation of the crystallisable polymer and cureable solvent can be seen using a scanning electron microscope (SEM). The contrast between different polymer phases can be enhanced in order to easily see the separation using the SEM. This enhancement can be achieved by selectively etching or staining one of the phases as described in "Polymer Microscopy" by L C Sawyer and D T Grubb (Chapman and Hall Ltd 1987).

When the curable solvent undergoes curing it takes part in a crosslinking reaction so as to form a high molecular weight crosslinked polymeric material. The curable solvent can be self-curable, that is a material which can cure by undergoing a crosslinking reaction with itself. Alternatively, the curable solvent can be a material which can undergo a crosslinking reaction with a suitable crosslinking agent.

When the curable solvent is self-curable it can, for example, be of the type which crosslinks in the presence of oxygen, for example, an unsaturated alkyd resin. Another example of a self-curable solvent is an epoxy functional resin which can be made to crosslink with itself in the presence of an acid catalyst.

Preferably, the curable solvent is a material which reacts with a crosslinking agent. The composition then also comprises suitable crosslinking agent. Preferably, the crosslinking agent is in the diluent. This has the advantage of reducing the possibility of premature crosslinking of the curable solvent.

The crosslinking agent can be dissolved or dispersed in the diluent, preferably it is dispersed. The advantage of the crosslinking agent being dispersed in the diluent is that the viscosity of the composition can remain low.

The curable solvent and crosslinking agent are chosen so as to have complementary co-reactive groups which can react together in a crosslinking reaction. Examples of co-reactive groups are amine groups and epoxide groups, carboxyl groups and epoxide groups, hydroxyl groups and isocyanate groups, amine groups and isocyanate groups and hydroxyl groups and alkoxymethylated nitrogen groups such as those found in melamine formaldehyde, urea formaldehyde and phenol formaldehyde resins.

Examples of types of curable solvent which react with suitable crosslinking agents are epoxy resins, acrylic resins, phenolic resins and polyester resins. Preferably the curable solvent is an epoxy resin.

One suitable class of epoxy resins are those prepared by reacting an epihalohydrin, such as epichlorohydrin with a dihydroxy phenolic compound such as bis(4 hydroxy phenyl) methane (bisphenol F) or 2,2-bis (4 hydroxy phenol) propane (bisphenol A). Many such epoxy resins are commercially available in a range of epoxy equivalent weights, particularly under the Trademark Epikote from Shell Chemicals Limited. These epoxy resins have the general formula:

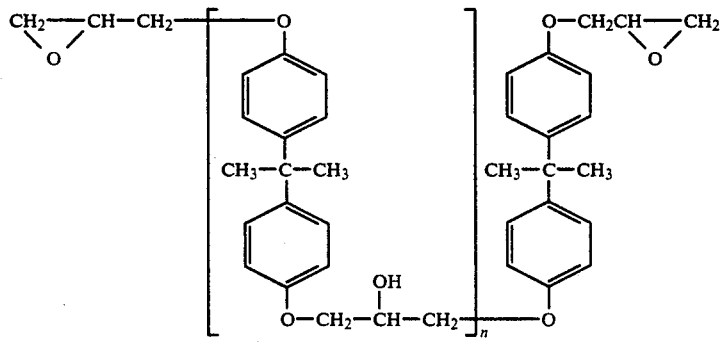

where n is preferably from 0 to 9 and may be non-integral, e.g. 1.2.

The epoxy resin can be an extended epoxy resin which comprises the reaction product of a standard epoxy resin, such as one of those described above, with a chain extender. Suitable chain extenders include diols for example diphenylol methane and diphenylol propane.

Other useful epoxy resins include glycidyl derivatives of terephthalic acid, isocyanurates, sorbitol and novolac resins which are polyphenol formaldehyde.

One commercially available polyester resin is Vesturit BL952 from Hüls chemicals.

One suitable type of polyester resin is a condensate of a mixture of terephthalic acid, isophthalic acid, adipic, trimethylol propane and neopentyl glycol.

When the curable solvent has hydroxyl groups or epoxide groups, examples of types of crosslinking agent which will react with the curable solvent are melamine formaldehydes, phenol formaldehydes, urea formaldehydes, diamines such as 1,6-hexamethylene diamine or triethylene tetramine and diacids such as oxalic, malonic or hexanedioic acid or anhydrides such as maleic anhydride or phthalic anhydride. Preferably the curing agent is a melamine formaldehyde resin. Many melamine formaldehyde resins are commercially available, for example from Dyno Cyanamid under the Trade Mark 'Cymel'.

The composition can also contain a catalyst for the curing of the solvent. The catalyst can either catalyse the self-crosslinking reaction of the curable solvent, the reaction of the curable solvent with the crosslinker or the reaction between the crystallisable polymer and the cureable solvent.

The catalyst can be present in the polymer phase or can be dissolved or dispersed in the diluent. When the curable solvent can undergo a self crosslinking reaction the catalyst is preferably in the diluent. This reduces the risk of premature crosslinking of the curable solvent during the preparation of the composition.

Examples of suitable catalysts are acids, particularly Lewis acids and sulphonic acids such as dinonyl naphthalene disulphonic acid.

Catalysts are generally used in an amount of up to about 1% by weight on polymer solids.

Certain curable solvents can also undergo reaction with the crystallisable polymer. For example if the curable solvent has epoxy groups and the crystallisable polymer has carboxyl groups then these can co-react on heating.

This co-reaction between the crystallisable polymer and the curable solvent generally takes place to a lesser extent than the crosslinking of the curable solvent. However, some co-reaction can be advantageous in that this creates covalent links between the curable solvent and the crystallisable polymer so leading to a more cohesive structure in coatings formed from the composition.

In addition to undergoing a crosslinking reaction, the curable solvent must also be capable of forming a solution with the crystallisable polymer. By "forming a solution" is meant that there is a temperature at or above ambient temperature above which the mixture of the curable solvent and the crystallisable polymer when pure will form a homogeneous single phase liquid solution which is clear to the unaided eye. Ambient temperature is generally between 10° and 25° C.

Preferably the curable solvent, crystallisable polymer and any auxiliary solvent are chosen such that they will only form a homogeneous solution when mixed together on heating them above ambient temperature for example 60°, preferably 120°, and most preferably 200° C. above ambient temperature.

One advantage of choosing the curable solvent, crystallisable polymer and any auxiliary solvent so that they will only form a homogeneous solution above ambient temperature is that at ambient temperature the compositions then comprise solid particles of crystallisable polymer comprising imbibed curable solvent.

The polymer phase can also optionally comprise an auxiliary solvent. An auxiliary solvent is a material which is compatible with the curable solvent and a mixture of which together with the curable solvent can form a solution with the crystallisable polymer. An advantage of having an auxiliary solvent is that it facilitates dissolution of the polymer in the curable solvent. A second advantage is that the viscosity of the solution is reduced, which means that the process of making the dispersion is easier to carry out.

Generally, the auxiliary solvent comprises no more than 50% by weight of the polymer phase, preferably no more than 30%. Examples of suitable auxiliary solvents are dimethyl phthalate and propylene carbonate.

The stabliser is a material which stabilises the dispersed particles or droplets of the polymer phase in the diluent so as to prevent or retard the settling out or flocculation of the particles or droplets. It also facilitates the formation of the dispersion.

The stabiliser comprises two components which are covalently bonded together. The components are, a component which is soluble in, or solvatable by, the diluent, referred to as the Solvated Component, and a second component which is reacted with or associated with the polymer phase, referred to as the Anchor Component.

The nature of the Solvated Component depends on the identity of the continuous diluent. For example, when the continuous diluent is an aliphatic hydrocarbon then the Solvated Component can be a hydrocarbon chain or a polybutadiene chain.

The Anchor Component can be one which reacts with or associates with the polymer phase.

Examples of suitable Anchor Components which associate with the polymer phase are polar acrylate and methacrylate polymers, and vinyl pyrrolidone polymers.

Examples of anchor components which can react with the polymer phase are acid group containing moieties, anhydride groups or epoxy containing groups.

These types of stabilisers are well known in the art and can be chosen from a large number of commerically available material or made using standards techniques.

The polymer phase can also comprise an additional non-crystallisable polymer, for example a rubber. Preferably the polymer phase comprises less than 90% by weight of non-crystallisable polymer, more preferably less than 50% and most preferably less than 10%.

The continuous diluent can comprise any non-aqueous liquid which is immiscible with the polymer phase. This means that the polymer phase is a discrete phase when in dispersion in the continuous phase. Preferably the diluent does nor react with any of the components of the polymer phase. Examples of suitable diluents are hydrocarbons such as $C_{10-20}$ hydrocarbons.

The compositions of the invention can also comprise other conventional coating components such as pigments, extenders, cosolvents and surfactants, and other film-forming resins.

The compositions can be made by a process which comprises forming a substantially homogeneous liquid solution of the crystallisable polymer in the curable solvent and subsequently emulsifying this liquid solution in the continuous diluent phase.

According to the present invention there is provided a process for making a curable composition, the composition comprising a polymer phase in dispersion in a non-aqueous continuous diluent, in which the polymer phase comprises a crystallisable polymer selected from polyesters, polyamides and polycarbonates, in intimate admixture with a curable solvent for the crystallisable polymer, a stabiliser and, optionally, an auxiliary solvent, the process comprising the steps of;

(i) forming a homogeneous liquid solution of the crystallisable polymer in the curable solvent optionally together with any auxiliary solvent, (ii) forming an emulsion by emulsifying the solution in a non-aqueous continuous diluent in the presence of a stabiliser, at a temperature at which the solution is a homogenous liquid, the diluent being chosen so as to be immiscible with the solution at the temperature at which the emulsification is carried out, and, (iii) allowing the emulsion to cool to ambient temperature.

A homogeneous solution is one which is substantially clear to the unaided eye. The homogeneous liquid solution of the crystallisable polymer in the curable solvent can be made by mixing the pure polymer and the solvent together and if necessary raising the temperature. Generally the mixture is physically agitated, for example stirred, to speed the dissolution process.

The solution so formed can be one of two types. Either it can be a Crystallisable solution or it can be a Permanently Amorphous (non-crystallisable) solution.

Crystallisable Solutions have a crystalline melt temperature ($T_m$) of the polymer in the solution. Crystallisable polymer can be made to recrystallise from this type of solution if the solution is cooled slowly from above its Crystalline Melt Temperature $T_m$, to ambient temperature, for example 10° to 25° C.

Solutions which are permanently amorphous do not exhibit a Crystalline Melt Temperature. The crystallisable polymer can not be made to recrystallise from Permanently Amorphous solutions.

The crystalline Melt Temperature ($T_m$) of the polymer in the solution can be determined by differential scanning calorimetry (DSC). The method to determine $T_m$ for the polymer in any given solution involves firstly determining the Crystalline Melting Point ($T_m$) for the pure crystalline polymer. The value of the $T_m$ for the pure crystalline polymer is then used in the determination of the for the $T_m$ for the solution.

The values of $T_m$ for a large number of known polymers are available from the literature. Alternatively, the $T_m$ for any crystallisable polymer can be experimentally determined.

In order to experimentally determine $T_m$ for the pure polymer a test cycle is carried out in which 10 mg of the polymer is heated in a DSC machine to 285° C. at a rate of 20° C./min and subsequently cooled at a rate of 20° C./min to ambient temperature. The $T_m$, if present, is seen as an endothermic peak on the graph of heat absorbed against temperature as the temperature is raised.

Certain crystallisable polymers or mixtures of crystallisable polymers exhibit more than one endothermic peak. In these cases $T_m$ is taken to be at the peak which is highest in temperature.

Certain crystallisable polymers do not show an endothermic peak due to $T_m$ during the test cycle. This is because they are in a metastable amorphous state when supplied. In this case the polymer is converted to the crystalline state and the test is then repeated. The crystallisable polymer can be made crystalline by contacting it with a suitable solvent such as a low molecular weight ketone for example acetone or methyl ethyl ketone, so as to cause crystallisation. The test cycle is then repeated and a value for $T_m$ obtained.

In order to determine $T_m$ for the solution under consideration, a test solution is made up by heating the desired mixture of the pure crystallisable polymer in powder form with a particle size less than 250μ, curable solvent and any auxiliary solvent with stirring to a temperature 20° C. above the $T_m$ of the pure polymer. The test solution is held at this temperature for 5 minutes before being allowed to cool to ambient temperature.

The test solution is subjected to a test cycle in which 10 mg of the solution is heated in the DSC to a temperature equal to $T_m$ for the pure polymer at a rate of 20° C./min and subsequently cooled to ambient temperature at a rate of 20° C./min.

Again, as with the pure polymer $T_m$ seen as an endothermic on the graph of heat absorbed against temperature and where more than one peak appears then the value for $T_m$ is taken from the highest peak.

Certain mixtures do not show an endothermic peak due to $T_m$ in the heating/cooling cycle. When no endothermic peak appears, a fresh sample solution is annealed by heating to an Annealing Temperature and holding it at that temperature for 1 hour. The Annealing Temperature is defined with reference to the $T_m$ of the pure crystallisable polymer. The Annealing Temperature is 80° C. below the $T_m$ of the pure crystallisable polymer.

A further heating/cooling cycle is then carried out. If no endothermic peak is then observed, annealing is carried out on fresh samples for 2, 3, 4 and 5 hours after each of which a heating/cooling cycle is carried out. Once an endothermic trough does appear then the value of $T_m$ is recorded from this cycle. If after five hours annealing at this temperature still no trough appears, then the annealing procedure is repeated at a temperature 100° C. below the $T_m$ of the pure polymer.

If after 5 hours at 80° C. below the $T_m$ of the pure polymer and 5 hours 100° C. below $T_m$ of the pure polymers then still no peak appears the mixture is said to have no Crystalline Melt Temperature $T_m$. The resulting solution is referred to as a Permanently Amorphous Solution.

Where a $T_m$ is measured then recrystallisation of the polymer from the solution can occur at temperatures at or above ambient temperature. The resulting solution is then referred to as a Crystallisable Solution. Preferably the solution is a Crystallisable Solution.

Preferably the crystalline melt temperature of the polymer in the solution is above 100° C. more preferably above 130° C. most preferably above 150° C.

The emulsification step (ii) can be carried out using conventional emulsifying apparatus such as a high speed stirrer or ultrasonic disperser. One particularly convenient high speed stirrer is a Silverson high speed stirrer available from Silverson Ltd.

When the crystallisable polymer and curable solvent can form a homogeneous solution at ambient temperatures then the emulsion step (ii) can be carried out at ambient temperature.

When the curable solvent comprises an extended epoxy resin, the composition can conveniently be made by first dissolving the crystallisable polymer in a mixture of a standard epoxy resin and a chain extender and subsequently forming the emulsion. The emulsion is then raised to a reaction temperature at which the epoxy resin and the chain extender can react together in the presence of a suitable catalyst so as to form the extended epoxy resin. A suitable catalyst for the reaction is then added, and the emulsion is held at the reaction temperature, for example for 0.25 to 2 hours.

When the crystallisable polymer and curable solvent will only form a homogeneous solution at elevated temperature then the emulsion is carried out at a temperature at or above that elevated temperature.

When the solution has a measurable $T_m$, and so is a Crystallisable Solution, the morphology of the dispersed polymer phase at ambient temperature depends on the rate at which the emulsion is allowed to cool to ambient temperature.

Generally, if the emulsion is allowed to cool slowly then recrystallisation of the crystallisable polymer will occur and the resulting composition comprises a dispersion in which the polymer phase contains recrystallised polymer. Slowly means at a rate no faster than 20° C. per minute, for example 1° C. per minute.

Rapid cooling of the emulsion results in a dispersion of particles or droplets in an amorphous state. Rapid cooling generally means at a rate faster than 50° C. per minute.

Any crosslinking agent is added after the emulsification step (ii). Preferably it is added so as to form a dispersion in the diluent.

The size of the droplets or particles of the polymer phase depends on the viscosity of the solution at the temperature at which the emulsion step is carried out, the degree of agitation and the quantity of stabiliser used. A lower solution viscosity, a greater degree of agitation, or a larger quantity of stabiliser will give rise to smaller droplets or particles.

When the polymer phase is solid at ambient temperatures then the solid particles of polymer can be separated from the continuous diluent as free flowing powders in a modification of the above process.

The modified process comprises the further steps of;
(iv) isolating the solid polymer phase particles from the composition produced in step (iii), and
(v) allowing the isolated particles to dry so as to remove the diluent,
whereby a powder comprising particles of polymer is obtained which contain entrapped curable solvent.

Optionally the isolated particles can be rinsed with a liquid which is not a solvent for the particles, in order to remove any unwanted residues of the diluent.

The particles can be isolated by filtering or by centrifuging. Filtering can be carried out by passing the emulsion through a filter medium for example filter paper or sintered glass.

Preferably the particles of polymer phase have a size of from 1-50μ when it desired to isolate them by the modified process. Particles in this size range are easy to isolate and are of a size suitable for use in coatings application.

According to a further aspect of the present invention there is provided a powder of crystallisable polymer particles which contain an entrapped curable solvent isolated according to the above modified process.

A crosslinking agent in solid powder form can be blended with the powder of crystallisable polymer particles.

This is a useful step when the curable solvent is not self curable and requires a crosslinking agent. The addition of the crosslinker as a separate powder reduces the chance of premature crosslinking and gellation.

These polymer particles can be redispersed in a liquid carrier so as to form a redispersed particle composition which is a liquid composition containing the redispersed particles. According to a further aspect of the present invention there is provided a redispersed particle composition which comprises particles as described above redispersed in a liquid carrier.

The liquid carrier in which the particles are redispersed can be the same as the continuous diluent from which the particles are isolated or it can be different. Preferably it is different. The liquid carrier can for example be a coating composition which can be based on an organic solvent or water. Coating compositions typically comprise a film-forming polymer and a liquid diluent. The film-forming polymer can be a curable resin which is co-curable with the curable solvent in the particles. Typical binders for coating compositions are described in the third edition of the book 'Introduction to Paint Chemistry' by G P A Turner published by Chapman and Hall of London in 1988.

The particles can be redispersed under low shear conditions for example by stirring the particles in the liquid carrier.

The composition according to the invention, the polymer particles of the invention, or the redispersed particle composition of the invention can be used in a coating process.

According to a further aspect of the present invention there is provided a process for forming a cured coating on the surface of a subs rate which comprises the steps of;
i) applying a layer of a composition is described above or a powder of polymer particles as described above or a redispersed particle composition as described above to the surface of the substrate, and
ii) heating the applied layer to a temperature at least high enough to cause the solvent to cure.

Preferably the crystallisable polymer is chosen so that it redissolves in the curable solvent at the temperature at which the compositions is cured, after evaporation of any diluent.

Where appropriate the composition applied also comprises a crosslinking agent.

The compositions or particles can be applied to the substrate by conventional application means. Examples of conventional application means for liquid compositions are brushing, spraying, dipping or roller-coating. An example of a conventional application means for powder is electrostatic spray.

Typically the applied layer is heated to between 50° and 300° C. more typically between 150° and 250° C. Typically the layer is heated for between 15 seconds and 15 minutes so as to cause the solvent to cure.

It has been found that a short annealing step after curing produces improved film properties. Annealing involves heating the cured film to about 80° C. below the Tm of the pure crystallisable polymer for between 10 minutes and 3 hours, typically about 30 minutes.

The surfaces coated according to this invention can be metallic for example aluminium, stainless steel or non-metallic, for example glass, wood, paper or textile. The composition can be used to impregnate continuous rovings of a wide variety of fibres including glass and carbon fibres by application to the surface of the fibres. The impregnated fibres, can be shaped during curing to produce a composite which on cooling comprises fibre consolidated in cured solvent.

In particular the composition or powder can be used to coat sheets, such as metal sheets which are to be used in shaping processes, and shaped articles such as cans for example food or beverage cans.

The invention also provides a substrate when coated by using the above process.

The composition or powder can also be used to form free films, that is sheets of cured composition unsupported by being adhered to a substrate. These sheets can be made by first forming a cured coating by the above process followed by peeling the coating from the substrate.

The invention will be illustrated by the following examples:

EXAMPLES

Preparation of Dispersants

The following dispersants were used in making compositions according to the invention.

Dispersant A: Polybutadiene/Methylmethacrylate/Methacrylic Acid Dispersant

| Charge 1 | |
|---|---|
| Toluene | 396.14 |
| Polybutadiend (Lithene N4 5000) | 199.74 |
| White Spirit | 197.74 |
| Charge 2 | |
| Methyl Methacrylate | 187.72 |
| Methacrylic acid | 11.98 |
| Lucidol P 25 (Benzoyl peroxide containing 25% water) | 5.33 |

Lithene is a Trade Mark of Revertex

Charge 2 was added over 1.5 hours to Charge 1 at 120°–125° C., reflux temperature. After a further 0.5 hours Trigonox 21B 70 (tertiary butyl per-2-ethylthexanoate, Trigonox is a Trade Mark of Ciba Chemicals, 1.33 parts) was added, and heating was continued for a further hour. Solvent (99.1 parts) was removed by distillation and replaced by an equal volume of white spirit.

The product was opalescent with a viscosity of 0.5 to 1.0 Pas and a measured solid content of 37%.

Dispersant B: A polyhydroxystearic acid/methyl methacrylate/glycidyl methacrylate dispersant a) Poly-12-hydroxystearic acid A mixture of 12-hydroxystearic acid (847.61 g) toluene (150.69 g), and methane sulphonic acid (1.70 g) was heated to between 140°–150° C. Water was removed azeotropically and was replaced during its removal by an equal volume of toluene. Water removal was continued from 6 to 7 hours until the acid value was between 32 and 34 mg KOH/g.

The product obtained was a solution of poly-12-hydroxystearic acid in toluene of solids contents 81%.

b) Poly-12-hydroxystearic Acid: Glycidyl Methacrylate Adduct

A mixture was made up of the following reagents:

| poly-12-hydroxystearic acid solution (81% in toluene) | 565.19 g |
|---|---|
| Hydrosol 130–160° C. <5% | 21.29 g |
| glycidylmethacrylate | 51.63 g |
| Armeen DMCD | 1.92 g |
| hydroquinone | 0.67 g |
| Hydrosol 130–160° C. <5% | 359.30 g |

(Armeen DMCD is dimethyl "coconut fatty amine" Armeen is a Trade Mark).
(Hydrosol 130°–160° C. <5% is an aliphatic hydrocarbon mixture containing less than 5% of aromatic hydrocarbon available from Hydrocarbures St Denis, France).

The mixture as described above was heated to reflux (140°–150° C.) for 6 hours until an acid value of 1 mg KOH/g was obtained. Further amounts (0.67 g each) of Armeen DMCD were added to the refluxing mixture after 3 and 4 hours of reflux. The product was a solution of adduct of 50% solids content.

c) Dispersant

The following mixture of reagents was made up:

| methyl methacrylate | 190.05 g |
|---|---|
| acrylic acid | 10.00 g |
| azodiisobutyronitrile | 3.96 g |
| poly-12-hydroxystearic acid-glycidyl methacrylate adduct | 395.90 g |

The reaction mixture as described above was added over 3 hours to a mixture of butyl acetate (133.37 g) and ethyl acetate (266.72 g) at reflux temperature. When the addition had been completed, heating was continued. After 30 minutes a portion of azodiisobutyronitrile slurry in ethyl acetate (1 g in 1.5 g) was added to the reaction mixture. After a further 30 minutes another portion of azodiisobutyronitrile slurry in ethyl acetate (1 g in 1.5 g) was added.

Following the addition of the second portion of azodiisobutyronitrile, part of the solvent (140 g) was removed by distillation and replaced by Hydrosol 130°–160° C. <5% (140 g). A further portion (140 g) of solvent was removed by distillation and replaced by a further portion (140 g) of Hydrosol 130°–160° C. <5%.

Dispersant C: Polybutadiene/Methylmethacrylate dispersant

| Charge 1 | |
|---|---|
| Toluene | 593.85 |
| Polybutadiene (Lithene N4 5000) | 199.74 |
| Charge 2 | |
| Methyl methacrylate | 177.47 |
| Lucidol P25 (Benzoyl Peroxide) | 4.73 |

Charge 2 was added to Charge 1 over 1.5 hours at reflux temperature. The Mixture was held at reflux temperature for 30 minutes and Trigonox 21B 70 (1.18 parts) was added. The mixture was held at reflux temperature for 0.5 hours and more Trigonox 21B 70 (1.18 parts) was added. The mixture was held at reflux temperature for a further 0.5 hours and half of the Toluene was then removed by distillation and replaced by white spirit (296 parts). The resulting dispersant was jelly-like and had a solid content of 37%.

Dispersant D: Polyhydroxystearic Acid/methylmethacrylate/acrylic acid dispersant a) Poly-12-hydroxystearic Acid: Acrylic Acid Adduct A mixture was made up of the following reagents:

| poly-12-hydroxystearic acid solution (81% in toluene) (as described for Dispersant B above) | 565.19 g |
|---|---|
| Hydrosol 130–160° C.; <5% | 21.29 g |
| acrylic acid | 51.63 g |
| Armeen DMCD | 1.92 g |
| hydroquinone | 0.67 g |
| Hydrosol 130–160° C.; <5% | 359.30 g |

(Armeen DMCD is dimethyl "coconut fatty amine").
(Hydrosol 130°–160° C. <5% is an aliphatic hydrocarbon mixture containing less than 5% of aromatic hydrocarbon available from Hydrocarbures St Denis, France).

The mixture as described above was heated to reflux (140°-150° C.) for 6 hours until an acid value of 1 mg KOH/g was obtained. Further amounts (0.67 g each) of Armeen DMCD were added to the refluxing mixture after 3 and 4 hours of reflux. The product was a solution of adduct of 50% solids content.

b) Dispersant

The following mixture of reagents was made up:

| methyl methacrylate | 190.05 g |
|---|---|
| acrylic acid | 10.00 g |
| azodiisobutyronitrile | 3.96 g |
| poly-12-hydroxystearic acid-acrylic acid adduct | 395.90 g |

The reaction mixture as described above was added over 3 hours to a mixture of butyl acetate (133.37 g) and ethyl acetate (266.72 g) at reflux temperature. When the addition had been completed, heating was continued. After 30 minutes a portion of azodiisobutyronitrile slurry in ethyl acetate (1 g in 1.5 g) was added to the reaction mixture. After a further 30 minutes another portion of azodiisobutyronitrile slurry in ethyl acetate (1 g in 1.5 g) was added.

Following the addition of the second portion of azodiisobutyronitrile, part of the solvent (140 g) was removed by distillation and replaced by Hydrosol 130°-160° C. <5% (140 g). A further portion (140 g) of solvent was removed by distillation and replaced by a further portion (140 g) of Hydrosol 130°-160° C. <5%.

Preparation of Acrylic Polymer Curable Solvent

The following Acrylic Polymer solution was used in making Composition 9.

Dowanol PM (propylene glycol monomethyl ether from Dow Chemicals, 400 g) was added to a mixture of Methylmethacrylate (176.72 g), butyl acrylate (191.28 g), glycidyl methacrylate (32 g), and azodiisobutyronitrile (20 g) over 4 hours with stirring under nitrogen, at a temperature of 110° C. The mixture was held at 110° C. for a further 3 hours 40 minutes and then allowed to cool to room temperature. The resulting epoxy functional acrylic polymer solution had a non-volatile content of 49.7%. The polymer had a number average molecular weight of 3744 and a weight average molecular weight of 9349 both as measured by gel permeation chromatography. The polymer solution was used in Composition 9 below.

COMPOSITIONS ACCORDING TO THE INVENTION

Compositions 1 to 30

Compositions 1 to 32 show the preparation of various compositions according to the invention. The compositions were made according to Method 1 and using the components set out in Table 1. The $T_S$ for each composition together with the dispersion size and range for each is given in Table 2.

Method 1 - Compositions 1 to 30

The polymer, crosslinkable solvent and any auxiliary solvent were heated to temperature $T_S$ at which a substantially homogeneous solution was obtained. This solution was added to a mixture of the inert diluent and any dispersant, which had been preheated to 200° C.

The solution was emulsified in the diluent using a laboratory homogeniser (Silverson L2R made by Silverson Machines Ltd of Chesham, UK) fitted with a fine mesh screen (0.5 mm). The emulsification was carried out by immersing the homogeniser head in the diluent mixture, turning the homogeniser on to full power (ca.9000 rpm) and then adding the solution over a period of 1 to 2 minutes, with the temperature of the emulsion being maintained at about 220° C. The emulsification was continued for a further five minutes. The resulting milky emulsion was cooled using an ice-water bath while the homogeniser's speed was reduced to half power (ca.5000 rpm), until the temperature had reached 60° C. The cooling rate was between 20°-30° C./min in each case. The homogeniser and ice-bath were removed and the composition was allowed to cool to ambient temperature (about 20° C.).

TABLE 1

Table 1 lists the components for Compositions 1 to 30 which were all made according to Method 1 above. The percentage of Dispersant is by non-volatile weight on the non-volatile weight of the crystallisable polymer plus the curable solvent and any auxiliary solvent. The abbreviations used in the table are as follows:

ABBREVIATIONS FOR TABLE 1

Crystallisable Polymers

PET is a homopolymer of ethylene glycol and terephthalic acid, with an intrinsic viscosity of 0.64 to 0.66cm$^3$/g in orthochlorophenol at 25° C.

PET/I is a copolymer of ethylene glycol and a mixture of terephthalic and isophthalic acids in an 82:18 ratio, with an intrinsic viscoisty of 0.63 to 0.65 cm$^3$/g in orthochlorophenol at 25° C.

PBT is a homopolymer of butylene terephthalate available from Atochem under the Trade Mark Orgater TNM O.

PC is a polycarbonate available from Anic Spa of Italy under the Trade Mark Sinvet 251.

Hytrel 4056 is a polyester elastomer available from EI DuPont de Nemours.

Nylon 6 is available from Imperial Chemical Industries under the Trade Mark Maranyl B3.

Curable Solvents

Epikotes are glycidyl ethers of bisphenol A (2,2(bis-4-hydroxyphenyl propane) available in a range of molecular weights from Shell Chemicals.

Epikote 880 has an epoxy equivalent weight of 182-194.

Epikote 1001 has an epoxy equivalent weight of 450-500.

Epikote 1004 has an epoxy equivalent weight of 850-940.

Epikote 1007 has an epoxy equivalent weight of 1700-2050.

Phenoxy is a hydroxy functional resin based on the reaction product of bisphenol A with epichlorohydrin available from Union Carbide Chemicals as Phenoxy PKHH with a molecular weight in the region of 44000.

Phenolic 1 is a phenolic resin available from Schenectady—Midland Ltd under the Trade Mark Phenolic SFP—118.

Phenolic 2 is a phenolic resin available from Hoechst Chemicals under the Trade Mark Phenolic Phenodur 285.

Polyester is a polyester resin from Hüls Chemicals under the Trade Mark Vesturit BL 952.

Acrylic is a methyl methacrylate/butyl acrylate/glycidyl methacrylate copolymer made according to the method given above Bisphenol A is 2,2(bis 4 hydroxphenyl) propane.

Auxiliary Solvent

DMP is dimethyl phthalate.

Dispersants

Dispersants A to D are those prepared as described above.

The percentage of dispersant given is by non-volatile weight on the total weight of the dispersed polymer phase i.e. the sum of the weights of crystallisable polymer, curable solvent and any auxiliary solvent.

Diluent

The continuous diluent used was an aliphatic hydrocarbon available from Exxon Chemicals under the Trade Mark Exxsol D100.

TABLE 1

COMPOSITIONS MADE ACCORDING TO METHOD 1

| Comp. | Crystallisable Polymer | Curable Solvent | Aux. Solvent | Dispersant | Continuous Diluent |
|---|---|---|---|---|---|
| 1 | PET (46 g) | Epikote 1001 (46 g) | | A (8%) | (100 g) |
| 2 | PBT (40 g) | Epikote 1007 (40 g) | | D (8%) | (100 g) |
| 3 | PBT (40 g) | Epikote 1007 (40 g) | DMP (20 g) | D (8%) | (100 g) |
| 4 | Hytrel 4056 (46 g) | Epikote 880 (46 g) | | A (8%) | (100 g) |
| 5 | PET (40 g) | Epikote 880 (40 g) | DMP (20 g) | B (8%) | (100 g) |
| 6 | PET/I (40 g) | Phenoxy (40 g) | DMP (20 g) | A (8%) | (100 g) |
| 7 | PBT (46 g) | Phenolic 1 (46 g) | | A (8%) | (100 g) |
| 8 | PET/I (60 g) | Polyester/Phenolic 2 (20)/(12) g | DMP (15 g) | A (8 g) | (100 g) |
| 9 | PBT (46 g) | Acrylic (92 g) | | A (8%) | (100 g) |
| 10 | PBT/PC (40 g/20 g) | Epikote 880 (20 g) | DMP (20 g) | D (8%) | (100 g) |
| 11 | Nylon 6 (60 g) | Glycerol (40 g) | | A (8%) | (100 g) |
| 12 | Nylon 6 (70 g) | Bisphenol A/Ethylene Glycol (30 g/11 g) | | C (8%) | (100 g) |
| 13 | PBT (40 g) | Epikote 880 (40 g) | DMP (20 g) | D (8%) | (100 g) |
| 14 | PET/I (46 g) | Epikote 880 (46 g) | | C (8%) | (100 g) |
| 15 | PET/I (46 g) | Epikote 880 (46 g) | | D (8%) | (100 g) |
| 16 | PET/I (46 g) | Epikote 880 (46 g) | | A (8%) | (100 g) |
| 17 | PET (46 g) | Epikote 880 (46 g) | DMP (20 g) | B (8%) | (100 g) |
| 18 | PET/I (46 g) | Epikote 880 (46 g) | | None | (100 g) |
| 19 | PET/I (46 g) | Epikote 880 (46 g) | | A (0.25%) | (100 g) |
| 20 | PET/I (46 g) | Epikote 880 (46 g) | | A (1%) | (100 g) |
| 21 | PET/I (46 g) | Epikote 880 (46 g) | | A (5%) | (100 g) |
| 22 | PBT | Epikote 1001 | | D | (100 g) |
| | (46 g) | (46 g) | | (8%) | |
| 23 | PET/I (46 g) | Epikote 1001 (46 g) | | A (8%) | (100 g) |
| 24 | PET/I (46 g) | Epikote 1001 (46 g) | | A (8%) | (70 g) |
| 25 | PET/I (46 g) | Epikote 1001 (46 g) | | A (8%) | (42 g) |
| 26 | PET/I (46 g) | Epikote 1001 (46 g) | | A (8%) | (11 g) |
| 27 | PET/I (20 g) | Epikote 880 (20 g) | DMP (20 g) | D (8%) | (100 g) |
| 28 | PET/I (80 g) | Epikote 880 (20 g) | DMP (20 g) | D (8%) | (100 g) |
| 29 | PET/I (46 g) | Epikote 1004 (46 g) | | D (8%) | (100 g) |
| 30 | PC (40 g) | Epikote 880 (40 g) | DMP (20) | D (8%) | (100 g) |

TABLE 2

$T_s$ and dispersion size and range for the compositions given in Table 1.

Dispersion size and range was measured using an optical microscope, or for very small particle sizes e.g. less than 1μ an electron microscope.

| Composition | $T_s$ | Average Particle Size (μ) | Dispersion Size Range (μ) |
|---|---|---|---|
| 1 | 240 | 8 | 2–15 |
| 2 | 260 | 300 | 200–400 |
| 3 | 250 | 50 | 30–70 |
| 4 | 250 | 5 | 1–10 |
| 5 | 250 | 15 | 5–40 |
| 6 | 240 | 80 | 50–150 |
| 7 | 230 | 5 | 3–15 |
| 8 | 240 | 120 | 50–200 |
| 9 | 230 | 30 | 10–75 |
| 10 | 230 | 25 | 2–100 |
| 11 | 220 | 10 | 5–25 |
| 12 | 250 | 80 | 4–160 |
| 13 | 220 | 4 | 2–30 |
| 14 | 220 | 2 | 0.5–30 |
| 15 | 240 | 30 | 5–80 |
| 16 | 220 | 20 | 10–40 |
| 17 | 240 | 15 | 5–40 |
| 18 | 240 | — | Solid Mass |
| 19 | 220 | — | Spongy Mass |
| 20 | 220 | 5 | 2–30 |
| 21 | 220 | 12 | 3–25 |
| 22 | 240 | 30 | 8–50 |
| 23 | 250 | 2 | 0.1–8 |
| 24 | 250 | 3 | 1–10 |
| 25 | 250 | ·3 | 1–10 |
| 26 | 250 | — | Solid Mass |
| 27 | 220 | 5 | 0.5–50 |
| 28 | 220 | 7 | 2–20 |
| 29 | 240 | 10 | 5–15 |
| 30 | 240 | 3 | 1–10 |

It can be seen from the above that compositions 18 and 19 do not give dispersions. This is because they contain too little stabiliser, composition 18 having no stabiliser and composition 19 having only about 0.25% by weight of stabiliser on dispersed polymer phase. It can also be seen that composition 26 does not give a dispersion. This is because Composition 26 has a very high non-volatile content of around 90% whereas all the other compositions have a non-volatile content of 40% to 70% for example, Composition 25 has a non-volatile content of 70% and is a dispersion.

Compositions 31 and 32

Method 2

These were made according to Method 1 except that the emulsions were allowed to cool to ambient temperature without using an ice-bath. The components of compositions 31 and 32 are given in Table 3. The abbreviations used in Table 3 are the same as those in Table 1.

TABLE 3

| Comp. | Crystallisable Polymer | Curable Solvent | Dispersant | Inert Diluent |
|---|---|---|---|---|
| 31 | PBT (46 g) | Epikote 1001 (46 g) | D (8%) | A (100 g) |
| 32 | PET/I (46 g) | Epikote 880 (46 g) | A (8%) | A (100 g) |

Composition 31 flocculated into a thick cream with particles ranging from 2 to 100μ.

Composition 32 produced a dispersion which consisted of particles in the 5–120μ range and average particle size of 70μ.

Composition 33

Method 3

In a 400 ml beaker 46 g of PET/I and 46 g of Epikote 1001 were mixed and heated to the dissolution temperature of 220° C. where a homogeneous solution which was slightly hazy to the naked eye was obtained. To this solution 20 g of Dispersant A (from above) (at 40% non-volatiles) was added, and thoroughly mixed with the polymer solution. Then 100 g of Exxsol D100 at ambient temperature was added and a Silverson homogeniser head was immersed into the contents of the beaker, and further heat was applied until the temperature reached 200° C. (dispersion temperature). At this point the Silverson homogeniser was switched on to its maximum output (ca.9000 rpm) and the contents of the beaker were homogenised for 5 minutes. After this period, the beaker was cooled in the same manner as described in Method 1. The final dispersion consisted of particles whose average size was 20μ and sediments after about 12 hours.

Composition 34

The above procedure was repeated according to Method 3 but PBT was used instead of PET/I and the dissolution and dispersion temperature was 230° C. The final dispersion consisted of particle whose average size was 30μ and which sedimented after 5 hours.

Composition 35: Method 4

In a 400 ml beaker 46 g of PET/I, 46 g of Epikote 880, 100 g of Exxsol D100 and 24 g of Dispersant D (at 33% non-volatile) were heated to 200° C. At this temperature a Silverson homogeniser head was immersed into the contents of the beaker and further heat applied until the temperature of 200° C. was reached again, when the contents were homogenised with the Silverson homogeniser operating at maximum output (ca.9000 rpm). After 3 minutes of emulsification, the beaker was cooled in a manner described in Method 1. The final dispersion consisted of largely spherical particles whose average size was 50μ and it sediments after 2 hours.

Composition 36: Method 5

In a 400 ml beaker 37.6 g of Epikote 880, 11.4 g of Bisphenol A and 49 g of PET/I were mixed and heated to 220° C. where a homogeneous solution is obtained. This solution was emulsified with the aid of a Silverson Homogeniser in 100 g of Exxsol D100 containing 12 g of dispersant A (at 65% non-volatiles) as described in Method 1. A fine milky dispersion was obtained and the dispersion was allowed to cool naturally from 190° C. to 180° C. At this stage 0.08 g of triphenyl ethyl phosphonium iodide (TPEPI) was added to the dispersion with the Silverson homogeniser maintained at its maximum output. Upon addition of TPEPI, the temperature rose sharply from 180° C. to 185° C., indicating that a reaction has occurred between the epoxy and Bisphenol A. After five minutes, the dispersion was cooled in a manner as described in Method 1, yielding a dispersion with an average particle size of 5μ.

TESTING THE COMPOSITIONS

Compositions according to the invention were tested on their performance in forming cured coatings. A crosslinking agent was added to some of the compositions prior to testing and this was dispersed in the compositions by means of a 'Silverson' high speed homogeniser.

The resulting compositions were applied by means of "K Bars" onto clean aluminium panels of dimensions 300 mm ×100 m ×0.22 mm. The K Bars are stainless steel bars, wound with stainless steel wire of selected diameters, to give predetermined wet film deposits, whose thickness depends upon the diameter of the wounding steel wire. The "K Bar" to be used depends upon the required thickness of the final film and the quality of dispersion, in the cases given below the "K-bars" used were numbers 3, 4, 6 or 8. ("K-bars" are supplied by R K Print-Coat Instruments Ltd, Royston, Herts (UK).

The resulting coated aluminium panels were subjected to a curing step which comprised heating the panel in an oven for a predetermined length of time and with the oven at such a temperature as to cause the temperature of the metal to reach a predetermined peak metal temperature (PMT) at the end of the heating step. The metal temperature is measured using a thermocouple which is held in contact with the reverse uncoated side of the metal panel by means of heat resistant tape. The temperature of the oven is adjusted so as to give the required PMT by trial and error using an uncoated aluminium panel.

The composition, crosslinking agent and curing schedule are each given in Table 4.

Compositions 1 to 6 and 13 to 29 have a crystallisable polyester in them together with an epoxy polymer curable solvent. Compositions 7 to 11 have various other and curable solvent.

Abbreviations for Table 4

Crosslinking agents

A is Cymel 1141 a melamine formaldehyde resin from Dyno Cyanamid

B is Cymel 350 a melamine formaldehyde resin from Dyno Cyanamid, used in the form of a dispersion made by dispersing 60 g of Cymel 350 in 35 g of Exxsol D100 in the presence of 16.2 g of dispersent A (see above).

C is Cymel 303 a melamine formaldehyde resin from Dyno Cyanamid
D is polybutadiene chemically modified by maleic anhydride available as Lithene N4'-5000 10 MA from Revertex Chemicals Ltd
E is Polybutadiene chemically modified by maleic anhydride available as Lithane N4-5000 5 MA from Revertex Chemicals Ltd
F is 3,3'diaminodiphenyl sulphone available from Aldrich Chemicals
G is a 10% solution of a blocked dinonylnaphthalene disulphonic acid in butyoxyethanol available as Nacure from King Industries.
H is Synprolam 35N3 available from ICI.

Stoving Schedule
  J: heat for 3 minutes to 250° C. PMT
  K: heat for 10 minutes to 240° C. PMT
  L: heat for 5 minutes to 230° C. PMT
  M: heat for 3 minutes to 230° C. PMT
  N: heat for 5 minutes to 220° C. PMT
  P: heat for 15 seconds to 285° C. PMT
  Q: heat for 15 seconds to 270° C. PMT
  R: heat for 10 minutes to 210° C. PMT

TABLE 4

| Composition | Crosslinking Agent (Non-volatile Weight) | Catalyst | Stoving Schedule | Panel |
|---|---|---|---|---|
| 1 | None | None | J | 1 |
| 4 (80 g) | B (3.1 g) | " | L | 4 |
| 5 (80 g) | " | " | L | 5 |
| 6 | None | " | J | 6 |
| 7 (50 g) | B (3.1 g) | " | M | 7 |
| 8 (50 g) | B (2.1 g) | " | M | 8 |
| 9 | None | " | M | 9 |
| 10 (50 g) | H (1.4 g) | " | M | 10 |
| 11 (50 g) | A (2.9 g) | G (0.2 g) | M | 11 |
| 13 (80 g) | A (3.1 g) | None | Q | 13A |
| 13 (50 g) | A (1 g)/D (5 g) | G (0.1 g) | Q | 13B |
| 13 (50 g) | A (1 g) A (5 g) | G (0.1 g) | R | 13C |
| 15 (80 g) | F (3.7 g) | " | K | 15 |
| 22 (80 g) | B (3.7 g) | " | K | 22 |
| 23 (80 g) | B (3.7 g) | " | P | 23 |
| 24 (50 g) | A (1.2 g) | G (0.12 g) | R | 24A |
| 24 (50 g) | A (1.2 g) E (2.5 g) | G (0.12 g) | R | 24B |
| 24 (50 g) | C (1.72 g) | G (0.15 g) | R | 24C |
| 24 (50 g) | A (1.0 g) (D (2.5 g) | None | R | 24D |
| 27 (80 g) | H (8.4 g) | " | M | 27 |
| 28 (80 g) | H (2.1 g) | " | M | 28 |
| 29 (50 g) | A (1 g) | G (0.1 g) | R | 29A |
| 29 (50 g) | A (1 g) D (1.5 g) | G (0.1 g) | Q | 29B |

The cured coated panels were then subjected to an umber of tests. The tests were the Cross Hatch Test, the MEK Double Rub Test, the Acid Boil Test, the Water Boil Test and the Wedge Bend Test. These are described individually below. The Film Thickness, the results of the MEK Rub Test and Appearance are given in Table 5 below. The results of the Cross Hatch Test, Acid and water boil tests and the Wedge Bend Test are given in Table 6 below.

Cross Hatch Test

The test is carried out at 20° C. The cured, coated aluminum plate is scored in a number of parallel lines about 2 mm apart using a sharp, pointed instrument or blade, or an Elcometer 107 cross hatch adhesion tester. The score marks cut completely through the coating to the metal beneath. A second set of scored lines is then drawn 2 mm apart, across and at right angles to the first set.

A strip of transparent adhesive tape is pressed down onto the coated surface across the scored lines, ensuring that all air bubbles are excluded. Scotch Tape Grade 610 is used.

The tape is then snatched off and the result graded numerically as below, according to the quantity of coating removed with the tape.
Grade 1: No removal of coating.
Grade 2: Slight removal of coating (Up to 10% of taped area).
Grade 3: Moderate removal of coating (10%-30% of taped area).
Grade 4: Severe removal of coating (30%-60% of taped area).
Grade 5: Almost complete removal of coating. (60%-100% of taped area).

MEK Double Rub Test

In the Rubbing Test, each coating was rubbed back and forth with a lambswool cloth soaked in methyl ethyl ketone. After a number of back and forth rubs, the coated surface became visible through the coating when viewed through an optical microscope at ten fold magnification. The number of back and forth rubs needed for this to happen is recorded.

Water or Acid Boil Test

A 5 cm$^2$ section of coated aluminium panel is scored with sets of parallel lines in the same way as for the Cross Hatch Test. The panel is then immersed in a boiling liquid which is either a 5% aqueous solution of acetic acid for the Acid Boil Test or alternatively in distilled water for the water boil test and is kept immersed in the boiling liquid for 30 minutes.

On removal the panel is rinsed and dried and then tested using grade 610 sticky tape and rated in the same way as for the Cross Hatch Test.

Wedge Bend Test

The test is performed at 20° C.

A strip of stoved coating on a aluminium plate approximately 10 cm ×4 cm, is bent along its long axis over a 5 mm mandrel into a U shape, with the coated surface outward.

This shaped strip is then placed onto the base plate of the apparatus locating it against the end stop and the hammer dropped onto it from the top of the guide rails. Due to the design of the base plate a wedge shaped stamping is obtained.

The formed bend is then immersed for two minutes in Copper Sulphate Solution and the film assessed for continuity along the length of the stamping. The percentage of the total length showing no breakdown is measured. Measurements are taken from the point where complete fracture first ceases, ignoring smaller isolated spots of fracture further along the test piece.

The test is repeated in triplicate and the mean value taken for the three determinations.

Abbreviations for Table 5

Film Appearance
A: Smooth Glossy even film
B: Smooth Glossy uneven film
C: Glossy film with some bits
D: Glossy film with some 'cissing'

E: Glossy Textured film

TABLE 5

RESULTS OF TESTING THE COATINGS

| Panel (from Table 4) | Film Thickness (μ) | Film Appearance | MEK Rubs |
|---|---|---|---|
| 1 | 25 | A | 10 |
| 4 | 12 | A | >100 |
| 5 | 13 | A | >100 |
| 6 | 22 | A | 19 |
| 7 | 20 | C | 20 |
| 8 | 80 | C | 100 |
| 9 | 20 | D | 40 |
| 10 | 60 | C | 100 |
| 11 | 15 | B | 100 |
| 13A | 12 | A | >100 |
| 13B | 12 | A | 35 |
| 13C | 10 | A | 20 |
| 15 | 10 | C | 90 |
| 22 | 30 | A | 50 |
| 23 | 12 | A | >100 |
| 24A | 10 | B | 24 |
| 24B | 10 | A | 6 |
| 24C | 10 | B | 25 |
| 24D | 12 | A | 6 |
| 27 | 30 | A | 20 |
| 28 | 25 | C | 11 |
| 29A | 10 | A | 6 |
| 29B | 11 | A | 5 |

TABLE 6

RESULTS OF TESTING THE COATINGS

| Panel | Cross Hatch Test-Grade: | Acid Boil Test-Grade: | Water Boil Test-Grade: | Wedge Bend Test (%) |
|---|---|---|---|---|
| 1 | 1 | 2 | 1 | 90 |
| 4 | 1 | 5 | 5 | 95 |
| 5 | 1 | 1 | 1 | 95 |
| 6 | 2 | 2 | 2 | 90 |
| 7 | 1 | — | — | — |
| 8 | 5 | — | — | — |
| 9 | 4 | — | — | — |
| 10 | 5 | — | — | — |
| 11 | 1 | — | — | — |
| 13A | 1 | 1 | 1 | 95 |
| 13B | 1 | 1 | 1 | 96 |
| 13C | 1 | 1 | 1 | 96 |
| 15 | — | — | — | 95 |
| 22 | 2 | — | — | 90 |
| 23 | 1 | 1 | 1 | 95 |
| 24A | 1 | 1 | 1 | 97 |
| 24B | 1 | 1 | 1 | 100 |
| 24C | 1 | 1 | 1 | 93 |
| 24D | 1 | 1 | 1 | 88 |
| 27 | 2 | 2 | 2 | 95 |
| 28 | 1 | 1 | 1 | 40 |
| 29A | 1 | 1 | 1 | 98 |
| 29B | 1 | 1 | 1 | 97 |

We claim:

1. A composition comprising a polymer phase in dispersion in a non-aqueous continuous diluent, in which the polymer phase comprises a crystallisable polymer, selected from the group consisting of polyesters, and polycarbonates, in intimate admixture with a curable solvent for the crystallisable polymer, a stabiliser and, optionally, an auxiliary solvent.

2. A composition according to claim 1 in which the dispersion of the polymer phase comprises droplets or particles of between 0.1 and 500μ diameter.

3. A composition according to claim 1 in which the weight ratio of the curable solvent to the crystallisable polymer in the polymer phase is from 5:85 to 85:15.

4. A composition according to claim 1 in which the polymer phase comprises at least 5% by weight of the composition.

5. A composition according to claim 1 in which the crystallisable polymer is a polyester.

6. A composition according to claim 1 in which the curable solvent is chosen such that phase separation of crystallisable polymer from the solution can occur on curing the solvent.

7. A composition according to claim 1 in which the curable solvent is a material which reacts with a crosslinking agent and the diluent phase also comprises a crosslinking agent for the curable solvent.

8. A composition according to claim 7 in which the crosslinking agent is dispersed in the diluent phase.

9. A composition according to claim 1 in which curable solvent is an epoxy resin.

10. A composition according to claim 1 which comprises solid particles of the polymer phase dispersed in the diluent.

11. A composition comprising a polymer phase in dispersion in a non-aqueous continuous diluent, in which the polymer phase comprises a crystallisable polymer selected from the group consisting of polyesters, polyamides and polycarbonates, in intimate admixture with a curable solvent for the crystallisable polymer which is a material which reacts with a crosslinking agent, a stabilizer and, optionally, an auxiliary solvent, and in which the diluent also comprises a crosslinking agent for the curable solvent.

* * * * *